P. BROMAN.
DUST PROOF JOURNAL BEARING FOR REVOLUBLE DISKS.
APPLICATION FILED JULY 31, 1908. RENEWED OCT. 18, 1909.

942,539.

Patented Dec. 7, 1909.

WITNESSES:
O. R. Erwin.
J. D. Bremer.

INVENTOR
Peter Broman
By Erwin & Wheeler
ATTORNEYS.

UNITED STATES PATENT OFFICE.

PETER BROMAN, OF BEAVER DAM, WISCONSIN, ASSIGNOR TO BEAVER DAM MANUFACTURING COMPANY, OF BEAVER DAM, WISCONSIN, A CORPORATION OF WISCONSIN.

DUST-PROOF JOURNAL-BEARING FOR REVOLUBLE DISKS.

942,539.     Specification of Letters Patent.     Patented Dec. 7, 1909.

Application filed July 31, 1908, Serial No. 446,209. Renewed October 18, 1909. Serial No. 523,198.

*To all whom it may concern:*

Be it known that I, PETER BROMAN, a citizen of the United States, residing at Beaver Dam, county of Dodge, and State of Wisconsin, have invented new and useful Improvements in Dust-Proof Journal-Bearings for Revoluble Disks, of which the following is a specification.

My invention relates to improvements in dust proof journal bearings for colters or that class of revoluble disks, which are adapted to be used with grain drills for opening a furrow in front of the seed ducts and it pertains more specially to the peculiar construction and relative arrangement of the disk, the hub and the journal bearings, by which the disk is revolubly connected with a supporting arm.

The construction of my invention is explained by reference to the accompanying drawings, in which—

Figure 1:
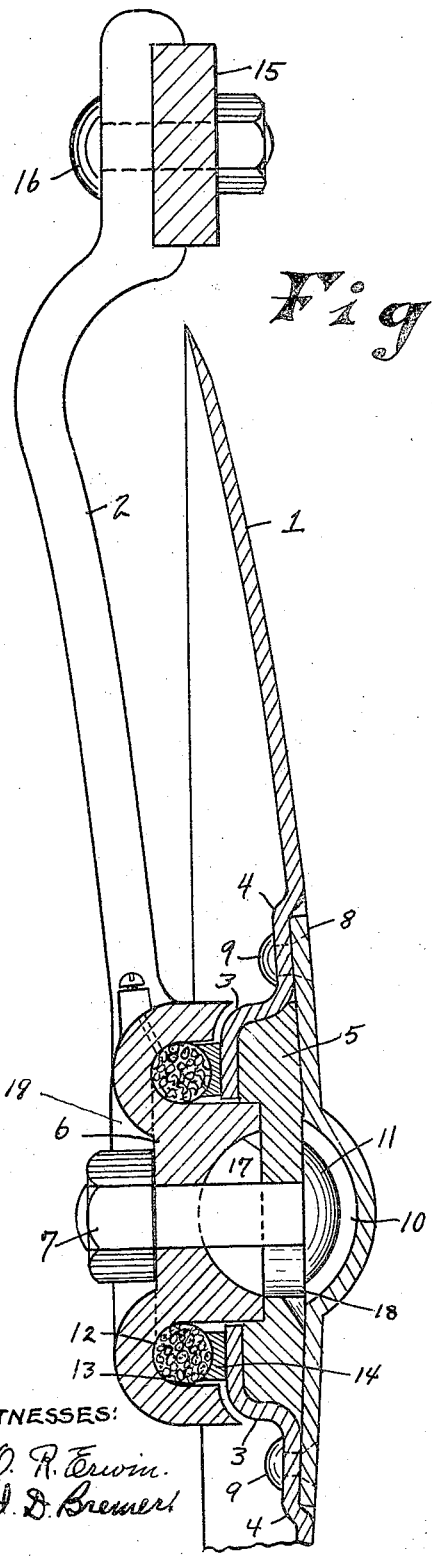
Figure 3:
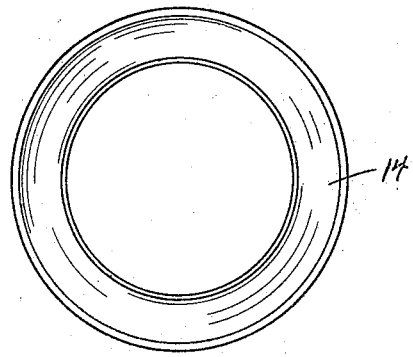
Figure 2:
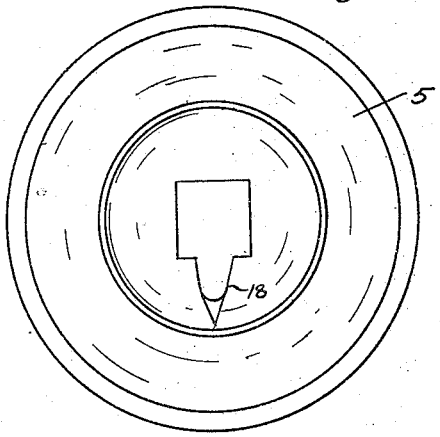

Figure 1 represents a vertical section of the disk, hubs and journal bearings in connection with a supporting arm. Fig. 2 represents a front view of a stationary bearing for supporting the disk. Fig. 3 represents a front view of a washer or ring for excluding the dust from the journal bearings.

Like parts are identified by the same reference figures throughout the several views.

1 is a disk and 2 the disk supporting arm. The disk 1 is formed integrally from a single sheet of steel, comprising and including the revoluble hub 3 and annular shoulder 4, which are formed by pressing the central portion of the disk inwardly toward the concave side of the disk. 5 is an annular stationary disk supporting bearing which conforms in shape to and is nicely fitted within the walls of the hollow hub 3 of the disk and is retained in place against the opposing surface of the hub 6 by the bolt 7. 8 is an inclosing cap, which is rigidly secured to the convex side of the disk 1, by a plurality of rivets 9. The center of the cap 8 is bent outwardly forming a chamber 10 for the reception of the head 11 of the bolt. Thus it is obvious that when the bearing 5 is secured in place and the disk 1 is secured thereon, said disk is adapted to revolve upon said stationary bearing 5 around said supporting bolt 7. The hub 6 is provided with an annular recess 12 for the reception of the annular packing 13 and packing ring 14.

The packing ring 14 is preferably made concave on the side toward the packing, whereby it conforms in shape to and is better adapted to hold said packing in place. The hub 6 is formed integrally with the arm 2 and the upper end of the arm 2 is rigidly connected with the draw bar 15 of the machine by the bolt 16. By thus forming the hub 3 by an inward depression of the central portion of the disk toward its concave side and closing the chamber of said hub by a closely fitting cap 8 between such parts, it is impossible for dust to enter the hub or journal bearings from the convex side of the disk.

It will be understood that the packing 13 and packing ring 14 close the joints between the revoluble hub of the disk and the stationary hub, whereby dust is prevented from entering the journal bearings of the disk from its concave side.

The hub 6 is preferably provided at its center with a concave chamber 17 for the reception of oil or other lubricating material.

18 is an oil channel through which the lubricant passes from the chamber 17 to the bearings between the member 5 and the cap 8.

The exterior side of the hub 6 is provided with a central chamber 19 for the reception of the nut 7, whereby the hub, disk and connecting parts occupy a minimum space and the maximum space is thereby left between the several disks of a series, as used together in a seeder and whereby the liability of the series of disks so used becoming clogged, is avoided.

Having thus described my invention what I claim as new and desire to secure by Letters Patent is—

1. In a device of the described class, the combination of a concavo-convex disk having its central portion bent inwardly toward the concave side thereof, forming a hollow hub revoluble with said disk, an annular stationary bearing located in said hub upon and around which said disk is adapted to revolve, an annular plate secured to the convex side of said disk adapted to bear against the exterior vertical surface of said stationary bearing, a disk supporting arm rigidly secured at one end to the draw bar of the machine with which said disk is used, a stationary hub affixed to the lower end of said arm and means for rigidly securing said disk supporting bearing to said hub.

2. In a device of the described class, the combination of a concavo-convex disk having its central portion bent inwardly toward the concave side thereof, forming a hollow hub revoluble with said disk, an annular stationary bearing located in said hub upon and around which said disk is adapted to revolve, an annular plate secured to the convex side of said disk, provided with a central chamber for the reception of the head of a central disk supporting bolt, adapted to bear against the exterior vertical surface of said stationary bearing, a disk supporting arm rigidly secured at one end to the draw bar of the machine with which said disk is used, a stationary hub affixed to the lower end of said arm and a central bolt adapted to rigidly support said stationary bearing in contact with the opposing surface of said stationary hub.

3. In a device of the described class, the combination of a concavo-convex disk having its central portion bent inwardly toward the concave side thereof forming a hollow hub revoluble with said disk, an annular stationary bearing located in said hub upon and around which said disk is adapted to revolve, an annular plate secured to the convex side of said disk, adapted to bear against the exterior vertical surface of said stationary bearing, a disk supporting arm rigidly secured at one end to the draw bar of the machine with which said disk is used, a stationary hub affixed to the lower end of said arm, means for rigidly securing said disk supporting bearing to said hub, an annular chamber formed in the periphery of said stationary hub and a dust proof packing located in said annular chamber, adapted to close the joints between said stationary and said revoluble hub.

4. In a device of the described class, the combination of a concavo-convex disk having its central portion bent inwardly toward the concave side thereof forming a hollow hub revoluble with said disk, an annular stationary bearing located in said hub upon and around which said disk is adapted to revolve, an annular plate secured to the convex side of said disk, adapted to bear against the exterior vertical surface of said stationary bearing, a disk supporting arm rigidly secured at one end to the draw bar of the machine with which said disk is used, a stationary hub affixed to the lower end of said arm, means for rigidly securing said disk supporting bearing to said hub, an annular chamber formed in the periphery of said stationary hub, a dust proof packing located in said annular chamber, adapted to close the joints between said stationary and said revoluble hub, and an annular ring interposed between said packing and the opposing surface of said revoluble hub.

In testimony whereof I affix my signature in the presence of two witnesses.

PETER BROMAN.

Witnesses:
 JAS. B. ERWIN,
 ALICE CHASE.